United States Patent [19]
Matz et al.

[11] Patent Number: 5,176,761
[45] Date of Patent: Jan. 5, 1993

[54] PROCESS FOR CHEMICALLY TREATING ALUMINUM WORK PIECES

[75] Inventors: Christoph Matz, Oldenburg; Erich Kock; Volker Muss, both of Bremen, all of Fed. Rep. of Germany

[73] Assignee: Deutsche Airbus GmbH, Hamburg, Fed. Rep. of Germany

[21] Appl. No.: 775,825

[22] Filed: Oct. 11, 1991

[30] Foreign Application Priority Data

Oct. 11, 1990 [DE] Fed. Rep. of Germany ....... 4032214

[51] Int. Cl.⁵ .............................................. C23C 22/06
[52] U.S. Cl. .................................. 148/253; 148/261; 148/270; 148/275
[58] Field of Search ................ 148/270, 275, 253, 261

[56] References Cited

U.S. PATENT DOCUMENTS 2,409,271 10/1946 Goldowski ......................... 148/270

FOREIGN PATENT DOCUMENTS 1140052 1/1969 United Kingdom ................ 148/275
2125833 3/1984 United Kingdom ................ 148/275

Primary Examiner—Sam Silverberg
Attorney, Agent, or Firm—W. G. Fasse

[57] ABSTRACT

Surfaces of structural components made of aluminum or aluminum alloys are chemically treated to produce an aluminum oxide coating for improved adhesive bonding to other components or to other surface layers. The oxidizing is accomplished by exposing the surface to be oxidized to a combination bath of an inorganic mineral acid and an oxidation medium for a specific time duration, so that an oxide coating is produced on the surface of the structural components, as a prerequisite for a good adhesion stability of adhesive bonds to be formed after oxidizing.

7 Claims, No Drawings

PROCESS FOR CHEMICALLY TREATING ALUMINUM WORK PIECES

FIELD OF THE INVENTION

The invention relates to a process for chemically treating work pieces made of aluminum or aluminum alloys to produce surfaces having an oxide coating needed for an adhesive bond with surface layers or other structural components.

BACKGROUND INFORMATION

In the production of structural components by adhesive bonding of individual components of aluminum or aluminum alloy, it is necessary that the surfaces of these components are pretreated to assure the required bonding strength. In this pretreatment of the aluminum components, the component surfaces are covered with an oxide coating, which is a necessary prerequisite for the desired adhesion stability of the adhesive bond. Until now, it was customary to produce the oxide film on the aluminum components by means of a so-called pickling-process, which works on the basis of chromic acid which provides good pretreatment coatings with strong adhesive properties.

The pickling-process, however, is negatively criticized due to the dangers that it can cause for the environment. Specifically, because the chromate necessary for the pickling should not be discharged into the environment after it has been used. In addition, energy is needed in the pickling process to heat the bath.

OBJECTS OF THE INVENTION

In view of the above it is the aim of the invention to achieve the following objects singly or in combination:

to provide a process for chemically treating structural components made of aluminum or aluminum alloy to form an aluminum oxide coating on the surface of such components, whereby the process takes into account the demands for lower environmental burdens;

to provide an oxidizing process that does not require additional energy for producing an adequate oxide layer on aluminum structural components; and to assure a tenacious bond between the oxide coating and the aluminum on the one hand and the oxide coating and the adhesive on the other hand.

SUMMARY OF THE INVENTION

According to the invention the surface of aluminum and aluminum alloy components is oxidized to form an aluminum oxide coating by exposing the respective surface, e.g. by immersion for a specific time duration in a combination bath of an inorganic mineral acid and an oxidation medium, said time duration being sufficient to form the oxide coating.

The process of the invention has the advantage of working with inexpensive chemicals, and also does not need any additional energy, since the combination bath works best at room temperature.

DETAILED DESCRIPTION OF PREFERRED EXAMPLE EMBODIMENTS AND OF THE BEST MODE OF THE INVENTION

Sulfuric or phosphoric acids are preferably used as the inorganic mineral acid. Peroxide-disulfide, such as the ammonium salt, or perborate, such as sodium salt are preferably used as the oxidation medium.

A time duration for the exposure of about thirty minutes has been found to be practical and sufficient to obtain a satisfactory oxide coating.

The combination bath should have an acid concentration of at least 3 mol per liter and an oxidation medium concentration of at least 0.3 mol per liter.

The treatment of aluminum or aluminum alloy structural components according to the invention, leads to optimal surface conditions for the subsequent adhesive bonding, since the oxide coating on the aluminum components ensures an excellent adhesion stability for the adhesive bonding. The present process, as compared to known processes, can be carried out with greater reliability, and it does not produce any disposal problems, the present bath is chromate-free.

As a further example, the process of the invention may be carried out with hydrogen peroxide ($H_2O_2$) as the oxidation medium. However, $H_2O_2$ has a lower redox potential than the above mentioned oxidation media. More specifically, a solution of hydrogen peroxide in an acidic carrier has a rather high decomposition rate. As a result, the effort and expense for properly controlled operating conditions may not be preferable.

The pretreatment according to the invention may also be achieved by the application of a combination oxidizing paste or by spraying a combination oxidizing solution onto the surfaces of the structural components to be oxidized.

Any of the treatments disclosed herein are followed by a proper rinsing with water.

Although the invention has been described with reference to specific example embodiments, it will be appreciated that it is intended to cover all modifications and equivalents within the scope of the appended claims.

What we claim is:

1. A process of producing an oxide coating on a surface of a structural component made of one of aluminum and aluminum alloys, comprising the following steps:
   (a) preparing an oxidizing agent by mixing an inorganic mineral acid selected from the group consisting of sulfuric acid and phosphoric acid and an oxidation medium selected from the group consisting of peroxide disulfide, perforate, and hydrogen-peroxide, said oxidizing agent having an acid concentration of at least 3 mol per liter and an oxidation medium concentration of at least 0.3 mol per liter,
   (b) exposing said surface of said structural component to said oxidizing agent at room temperature for a length of time sufficient to form said oxide coating, and
   (c) rinsing said surface.

2. The process of claim 1, wherein said peroxide disulfide is ammonium salt $(NH_4)_2S_2O_8$.

3. The process of claim 1, wherein said perborate is sodium salt $NaBO_2H_2O_2 \cdot 3H_2O$.

4. The process of claim 1, wherein said oxidizing agent is formed as a bath having said acid concentration of at least 3 mol per liter and said concentration of said oxidation medium of at least 0.3 mol per liter, and wherein said step of exposing is performed by immersing said structural component in said bath.

5. The process of claim 1, wherein said step of exposing this performed for about 30 minutes.

6. The process of claim 1, wherein said step of exposing is performed by applying a paste of said oxidizing agent onto said surface of said structural component.

7. The process of claim 1, wherein said step of exposing is performed by spraying a solution of said oxidizing agent onto said surface of said structural component.

* * * * *